Sept. 12, 1961 H. A. KLASENS ET AL 2,999,941

SOLID-STATE IMAGE INTENSIFIER

Filed Oct. 10, 1956

INVENTORS
HENDRIK ANNE KLASENS
JOHANNES GERRIT VAN SANTEN
HENDRIK JACOBUS MARIA JOORMANN

BY [signature]
AGENT 2,999,941
SOLID-STATE IMAGE INTENSIFIER

Hendrik Anne Klasens, Johannes Gerrit van Santen, and Hendrik Jacobus Maria Joormann, all of Eindhoven, Netherlands, assignors, by mesne assignments, to North American Philips Company, Inc., New York, N.Y., a corporation of Delaware Filed Oct. 10, 1956, Ser. No. 615,183
Claims priority, application Netherlands Oct. 14, 1955
8 Claims. (Cl. 250—213)

The invention relates to solid-state image intensifiers, that is to say to devices by means of which a radiation image can be amplified without the use of an evacuated vessel.

Recently a number of solid-state image amplifiers were described, all of which comprise a combination of a radiation-sensitive part and an electroluminescent part. In the radiation-sensitive part substances are used which on variation of the intensity of the incident radiation show a variation of their electric impedance. The electroluminescent part can emit radiation in that it is arranged between two electrodes to which an alternating voltage is applied the intensity of this radiation depending inter alia upon the intensity of the field and consequently upon the voltage set up between the electrodes. Since the radiation-sensitive part is arranged between the electroluminescent part and one of the electrodes, the voltage set up across the electroluminescent part varies with variation of the intensity of the radiation incident upon the radiation-sensitive part. It has been found that, with a suitable combination of a radiation-sensitive part and an electroluminescent part, the intensity of the radiation emitted by the electroluminescent part is higher than the intensity of the radiation incident upon the radiation-sensitive part.

In one practical embodiment of a known solid-state image intensifier, a base-layer, which acts as a support and may consist of glass, is coated with a thin conductive layer, and the latter is again coated with a layer of an electroluminescent substance. The thin conductive layer transmits the radiation emitted by the electroluminescent layer. At the side more remote from the support the electroluminescent layer is coated with a radiation-sensitive layer which in turn at the side more remote from the support is coated with an electrode which transmits the radiation to be intensified. As the material for the electroluminescent layer, use may be made of zinc sulphide activated with copper, and as the material for a radiation-sensitive layer, use may be made of cadmium sulphide or of antimony sulphide.

A solid-state image intensifier in accordance with the invention comprises two substantially parallel electrodes, an electroluminescent layer arranged between these electrodes so as to be parallel thereto and a radiation-sensitive layer which is arranged between this layer and one of the electrodes and contains a radiation-sensitive substance, and is characterized in that at least half of the radiation-sensitive substance is concentrated in at least one body shaped into a form such that the quotient of the volume and the surface area of these bodies is less than 0.1 times the thickness of the radiation-sensitive layer.

Experiments have shown that the special structure of the radiation-sensitive layer in accordance with the invention wherein the active substance is distributed in lumped amounts ensures an amplification factor materially exceeding that obtained by applying the same amount of radiation-sensitive material as a continuous uniform layer. This is probably due to the fact that the capacitance of the electroluminescent layer with respect to the electrodes is reduced when the radiation-collecting surface area is increased.

A further advantage consists in that the amplification factor for incident radiation between 3000 and 20,000 A. is less dependent upon the wave-length than in an amplifier having a uniform radiation-sensitive layer.

The bodies in which the radiation-sensitive substance is concentrated may be shaped in widely different forms; they may be elongated solid or hollow cylinders, thin strips, elongated prisms, parallelepipeds, and so on.

The material separating the bodies or part thereof from one another, hereinafter to be referred to as the added material, may be widely different. However, it has proved of advantage to choose a material having a lower dielectric constant than the radiation-sensitive substance itself. Furthermore, it is of advantage for the ratio between the amount of radiation-sensitive substance and the amount of added material to be such that the mean dielectric constant of the radiation-sensitive layer is less than one half of the dielectric constant of the radiation-sensitive substance itself.

The term "mean dielectric constant" as used herein is to be understood to mean the numerical value found by determining the dielectric constant of the radiation-sensitive layer in a known manner, the measurement being made on a layer of such surface area that no other mean dielectric constant is found when the measurement is made on a larger surface area of this layer. Since the radiation-sensitive substances generally have a high relative dielectric constant of between 5 and 15, many substances may be used as the added material. Suitable materials are, for example, polystyrene, ethyl-cellulose, glass, ceramic material. Thus, the mean dielectric constant of the radiation-sensitive layer can be influenced and controlled by the choice of the added material and by the choice of the ratio between the amount of radiation-sensitive substance and the amount of added material in the radiation-sensitive layer.

The radiation-sensitive layer may be made by perforating a member having a dielectric constant lower than the radiation-sensitive substance itself and by at least partially filling the perforations with the radiation-sensitive substance.

According to a particular embodiment of an image intensifier in accordance with the invention, the radiation-sensitive substance is coated as a thin layer on the wall of the apertures formed in the member.

Since it is desirable for as large as possible a part of the radiation to be amplified to strike the radiation-sensitive substance, the radiation-sensitive layer may also include a material which scatters the radiation to be amplified. This ensures a high conversion efficiency and, in addition, satisfactory operation is less dependent upon the direction of the incident radiation. When the radiation-sensitive substance is applied, as described hereinbefore, as a thin layer to the inner wall of apertures in the radiation-sensitive layer, the remaining space of these apertures can be filled with the scattering material. This can be effected in a simple manner when the radiation-sensitive layer consists of a perforated glass plate. The added material also may scatter the radiation to be amplified.

When radiation is to be amplified which is not satisfactorily absorbed by the radiation-sensitive substance, a luminescent material may be incorporated in the radiation-sensitive layer which satisfactorily absorbs the radiation to be amplified and converts it into a radiation which is satisfactorily absorbed by the radiation-sensitive substance. This luminescent material may replace the above-described radiation-scattering substances.

The invention will now be described in detail with reference to a drawing, in which FIG. 1 is a sectional view of a radiation intensifier in which the radiation-sensitive substance is concentrated in strip-shaped members;

Figures 1, 2, 3, 4, 5, 6, 7:
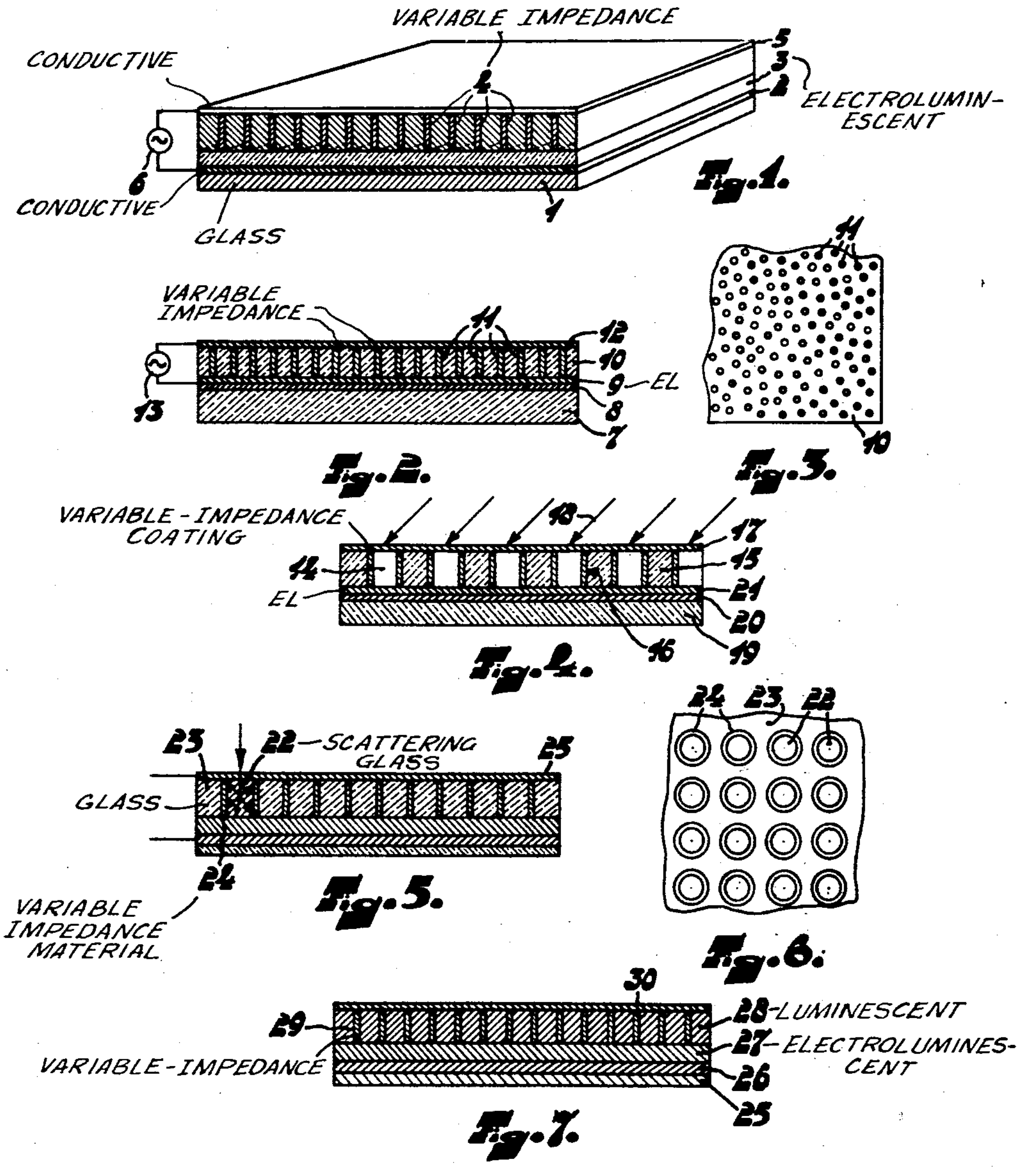
FIG. 2 is a sectional view of a solid-state image intensifier, in which the radiation-sensitive layer comprises elongated solid cylinders of radiation-sensitive substance.
FIG. 3 is a plan view of part of an image intensifier of the kind shown in FIG. 2.
FIG. 4 is a cross-sectional view of a solid-state image intensifier, in which the radiation-sensitive substance is applied as a thin layer to the walls of apertures formed in a support.
FIG. 5 is a sectional view of one embodiment of a solid-state image intensifier with the use of a scattering material.
FIG. 6 is a plan view of part of the image intensifier shown in FIG. 5.
FIG. 7 is a sectional view of an image intensifier for the amplification of X-rays.

For the sake of clearness, some parts are shown on a disproportionately large scale in the figures.

Referring now to FIG. 1, reference numeral 1 denotes a glass support coated with an electrode 2 which transmits the radiation emitted by an electroluminescent layer 3 and may be made of conductive stannic oxide. On the electroluminescent layer 3 provision is made of a radiation-sensitive layer, which may also be referred to as a radiation-responsive, variable-impedance layer, comprising strips 4 of a radiation-sensitive substance, for example cadmium sulphide, separated from one another by a substance having a lower dielectric constant, for example polystyrene. On top of the radiation-sensitive layer an electrode 5 is arranged which is permeable to the radiation to be amplified, may be made from aluminum and may be shaped in the form of a grid. An alternating voltage supply 6 is connected to the electrodes 2 and 5. The operation of this radiation-amplifier can be briefly described as follows.

The electroluminescent layer lies in the alternating field set up between the electrodes 2 and 5. Since between the electrode 5 and the electroluminescent layer 3 the radiation-sensitive layer 4 is interposed, the voltage set up between the electrodes 2 and 5 is distributed over the radiation-sensitive layer and the layer 3 in the ratio of the impedance of these layers. The impedance of the layer 3 does not change, but that of the layer 4 depends upon the conductivity which again depends upon the intensity of the radiation absorbed in the strips 4. The higher the impedance of the radiation-sensitive layer, the smaller is the part of the voltage set up across the electroluminescent layer 3. It has been found that by concentrating the radiation-sensitive substance in the strips 4 which are mounted on edge, the amplification factor exceeds that obtained by interposing the same amount of radiation-sensitive substance as a continuous uniform layer between the electrode 5 and the electroluminescent layer 3, the operating voltage being chosen so that in both cases the voltage across the electroluminescent layer 3, when irradiated, is the same. Obviously it is assumed that in both cases substantially all the incident radiation is absorbed.

FIG. 2 shows an embodiment in which the radiation-sensitive substance is distributed differently. This figure is a cross-sectional view of a solid-state image intensifier comprising a glass support 7 coated with an electrode 6, for example of conductive stannic oxide, and with an electroluminescent layer 9 which may consist of copper-activated zinc sulphide. On top of this layer 9 a glass member 10 is arranged wihich is provided with a plurality of apertures 11. These apertures are filled with radiation-sensitive material, for example cadmium sulphide. To the member 10 an electrode 12 is applied which transmits the radiation to be amplified. Similarly to the embodiment shown in FIG. 1 the layers 8 and 12 are connected to an alternating-voltage supply 13. The number and the size of the apertures are so chosen that the mean dielectric constant of the combined layer 10—11 is less than one half of the dielectric constant of the material introduced into the apertures 11.

The size and the number of the apertures can be calculated in a simple way as follows:

Suppose the cross-section of one aperture to be $p$ cm.$^2$ and the total surface of the radiation sensitive layer to be $q$ cm.$^2$. Then the ratio of the total cross-section of the apertures to the cross-section of the part of the radiation-sensitive layer between the apertures is $$\frac{n-p}{q-np}$$

wherein $n$ is the number of apertures.

The mean dielectric constant $D_m$ of the radiation-sensitive layer will then be $$D_m=\frac{npD_{rs}}{(q-np)D_g}$$

wherein $D_{rs}$ is the dielectric constant of the radiation-sensitive material and $D_g$ the dielectric constant of the material between the apertures. Thus preferably $$\frac{npD_{rs}}{(q-np)D_g}<\frac{1}{2}D_{rs}$$

which results in:

$$np<\frac{qD_g}{2+D_g}$$

FIG. 3 is a plan view of an element of the kind shown in FIG. 2 from which it may be seen that the apertures 11 are unevenly distributed about the entire surface area of the member 10. As is well known, such a glass member having a plurality of apertures can be manufactured photochemically.

Since air also has a dielectric constant which is considerably lower than the dielectric constant of most radiation-sensitive materials, the radiation-sensitive substance can be interposed between the electrode and the electro-luminescent layer without the use of any other solid substance. Thus, a porous structure is obtained. Obviously, the manufacture of such a layer is not simple, but the use of radiation-sensitive materials shaped into the form of needles enabled an image intensifier to be manufactured in which all the needles were arranged so as to be parallel to one another between the electroluminescent layer and the electrode.

FIG. 4 is a sectional view of a solid-state image intensifier similar to that shown in FIGURES 2 and 3. The only difference is that the radiation-sensitive substance does not completely fill the apertures 14 of the glass member 15, but is applied as a layer 16 to the inner wall of these apertures. It will be appreciated that in this embodiment part of the radiation would not fall on the radiation-sensitive substance when the surface of the electrode 17 is irradiated at right angles. Consequently, in this image intensifier, it is desirable for the radiation to fall on the electrode at an acute angle, as is shown by the arrows 18. In certain cases this may be a disadvantage, since now obviously the amplification is dependent upon the angle of incidence. The further parts of this image amplifier are: a glass support 19 and a thin conductive layer 20 which transmit the radiation emitted by the electroluminescent layer 21.

The sizes of the various parts of this image amplifier are as follows:

The glass support 19 is 2 mms. thick and the stannic oxide layer 20 applied thereto is at the most 1 micron thick. The layer 21 is 40 microns thick. The radiation-sensitive layer 15 is 2 mms. thick and the diameter of the apertures in the glass is 0.3 mm. The centre lines of the apertures are spaced apart by a distance of 0.5 mm. The radiation-sensitive layer 16 produced by deposition from vapour is 10 microns thick. With these values the quotient of the volume and the surface area of the bodies of radiation-sensitive material attains the value 0.005. The electrode 17 consists of an aluminum grid 1 micron thick which is deposited from vapour and coincides with the pattern of the apertures. This intensifier enables radiation between 3000 A. and 20,000 A. and cathode-rays to be amplified. With a supply voltage of 5 kv. and a frequency of 2000 c./s., the amplification is at least $10^3$ for visible light with a maximum contrast ratio of 25 db.

If the same amount of radiation-sensitive substance is applied as a unform layer, an intensifier is obtained which, with the same voltage set up across the electroluminescent layer, shows an amplification which for visible light hardly exceeds 1 and for infrared images, with a maximum contrast ratio of the initial image of less than 20 db, is at a maximum 50.

In order to reduce the directional dependence inherent in the intensifier shown in FIG. 4, use may be made of a construction as shown in FIG. 5. This figure is again a cross-sectional view and, as will be seen from the drawing, the structure of this embodiment is similar to that of the amplifier shown in FIG. 4. The only difference is that the apertures 22 in the member designated 23 are filled with a substance, for example magnesium oxide in synthetic resin, or opal glass, which scatters the incident radiation in all directions, as is indicated by arrows. This scattered radiation falls on the radiation-sensitive substance 24.

FIG. 6 is a plan view of part of the elements shown in FIGURES 4 and 5, the upper electrodes (17 in FIG. 4 and 25 in FIG. 5) being omitted.

In the image intensifier shown in FIG. 5 the apertures can be filled with a substance which converts the incident radiation into another radiation which is absorbed by the radiation-sensitive substance 24 instead of a radiation-scattering substance. This may be done when the radiation-sensitive substance 24 does not satisfactorily absorb the radiation to be amplified. This embodiment will be preferred, for example, for intensifying X-ray images. The apertures 22 may, in this case, be filled with luminescent material such as calcium tungstate or silver-activated zinc sulphide.

A modification of this embodiment is shown in FIG. 7. In this embodiment, a glass support 25 is coated with a layer of conductive stannic oxide 26 which is again coated with an electroluminescent layer 27. This layer 27 is again coated with a layer 28 consisting substantially of luminescent calcium tungstate and provided with a plurality of small apertures which are filled with a radiation-sensitive substance 29 which may be cadmium sulphide. To this layer a second electrode 30 is applied which transmits the radiation which is converted by the calcium tungstate into a radiation which can be absorbed by the elements 29.

Although the various figures of the drawing show embodiments in which all of the radiation-sensitive substance is concentrated in bodies which each fulfill the condition that the quotient of the volume and the surface area is less than 0.1 of the thickness of the radiation-sensitive layer, this is by no means necessary. If only half of the radiation substance is concentrated in such bodies an important improvement is obtained over intensifiers wherein the radiation-sensitive substance forms an homogeneous layer. Thus e.g. in FIG. 1 one third of the number of strips 4 may be combined into a single strip of a cross-section in the plane of the drawing such that for that thick strip the above-mentioned condition is not fulfilled.

What is claimed is:

1. A solid-state image intensifier comprising a radiation-receiving member and an electroluminescent member in juxtaposed relationship, and a pair of electrodes by means of which a potential can be applied to the juxtaposed radiation-receiving and electroluminescent members, said radiation-receiving member comprising a body containing two materials distributed in lumped amounts throughout the body, one of said materials being a radiation-absorbing and responsive variable-impedance material, the other material possessing a fixed impedance characteristic that increases the quantity of radiation absorbed by the said one material.

2. An image intensifier as set forth in claim 1 wherein the radiation-receiving member comprises an apertured matrix of photoconductive material with radiation-responsive luminescent material in the apertures.

3. An image intensifier as set forth in claim 1 wherein the radiation-receiving member comprises an apertured matrix of photoconductive material with radiation-scattering material in the apertures.

4. A solid-state image intensifier comprising, in the order named, a radiation-transparent electrode, a primary radiation-receiving layer, an electroluminescent layer, and a light-transparent electrode, said radiation-receiving layer comprising a member constituted of two materials distributed in lumped form through the member so as to extend between the radiation-transparent electrode and the electroluminescent layer, one of said materials being a secondary radiation-responsive, variable-impedance material, the other material being a luminescent material capable of converting incident primary radiation into a secondary radiation that can be absorbed by the variable-impedance material.

5. An image intensifier as set forth in claim 4 wherein the radiation-receiving layer comprises an apertured member, the said one material is a coating on the walls of the apertures, and the other material at least partially fills the remaining space in the apertures.

6. An image intensifier as set forth in claim 4 wherein the mean dielectric constant of the radiation-receiving layer is less than one-half that of the said one material.

7. A solid-state image intensifier comprising, in the order named, a radiation-transparent electrode, a radiation-receiving layer, an electroluminescent layer, and a light-transparent electrode, said radiation-receiving layer comprising a member constituted of two materials distributed in lumped form throughout the member so as to extend between the radiation-transparent electrode and the electroluminescent layer, one of said materials being a radiation-responsive, variable-impedance material, the other material being a material capable of scattering incident radiation and thus focus it on the variable-impedance material.

8. A solid-state image intensifier comprising, in the order named, a radiation-transparent electrode, a radiation-receiving layer, an electroluminescent layer, and a light-transparent electrode, said radiation-receiving layer comprising an apertured member containing a radiation-responsive, variable impedance coating on the aperture walls and in the remaining space a material capable of scattering incident radiation.

References Cited in the file of this patent

UNITED STATES PATENTS

| | | |
|---|---|---|
| 2,495,697 | Chilowsky | Jan. 31, 1950 |
| 2,760,077 | Longini | Aug. 21, 1956 |
| 2,773,992 | Ullery | Dec. 11, 1956 |
| 2,798,823 | Harper | July 9, 1957 |
| 2,835,822 | Williams | May 20, 1958 |
| 2,837,660 | Orthuber et al. | June 3, 1958 |